United States Patent [19]

Carnewal et al.

[11] Patent Number: 4,552,547
[45] Date of Patent: Nov. 12, 1985

[54] STRAW CHOPPER DRIVE

[75] Inventors: José A. C. L, Carnewal, Eeklo; Daniël M. Van Overschelde, Roeselare, both of Belgium

[73] Assignee: Sperry Corporation, New Holland, Pa.

[21] Appl. No.: 582,497

[22] Filed: Feb. 22, 1984

[30] Foreign Application Priority Data

Feb. 25, 1983 [GB] United Kingdom ............... 8305217

[51] Int. Cl.⁴ .............................................. F16H 7/08
[52] U.S. Cl. ...................................... 474/101; 474/89
[58] Field of Search .................... 474/101, 86, 88, 89, 474/133, 135, 136, 138

[56] References Cited

U.S. PATENT DOCUMENTS

| 1,640,623 | 8/1927 | Stein | 474/136 X |
| 1,893,501 | 1/1933 | Krawitz | 474/89 |
| 2,526,242 | 10/1950 | LaSalle | 474/89 X |
| 4,094,205 | 6/1978 | Cook | 474/89 X |

FOREIGN PATENT DOCUMENTS

| 901838 | 6/1972 | Canada | 474/89 X |
| 198987 | 1/1958 | Fed. Rep. of Germany | 474/89 X |
| 2443808 | 7/1975 | Fed. Rep. of Germany | 474/101 X |
| 2265379 | 11/1978 | Fed. Rep. of Germany | 474/89 X |
| 94881 | 2/1960 | Netherlands | 474/89 X |
| 1228283 | 4/1971 | United Kingdom | 474/89 X |

Primary Examiner—Stephen J. Novosad
Assistant Examiner—Thuy M. Bui
Attorney, Agent, or Firm—Larry W. Miller; Frank A. Seemar; Darrell F. Marquette

[57] ABSTRACT

A combine harvester having a straw chopper disposed at the rearward end thereof is disclosed wherein the drive mechanism for the straw chopper includes a driving member, a driven member and intermediate member located between the driving member and the driven member such that there is an angled line of drive between the driving member and the driven member. A first flexible drive transmission member extends between the driving member and the intermediate member. A second flexible drive transmission member extends between the intermediate member and the driven member. A first tensioning mechanism is operable to move the intermediate member in a direction to tension the first flexible drive transmission member. A second tensioning mechanism is operable to move the intermediate member in a direction to tension the second flexible drive transmission member.

19 Claims, 12 Drawing Figures

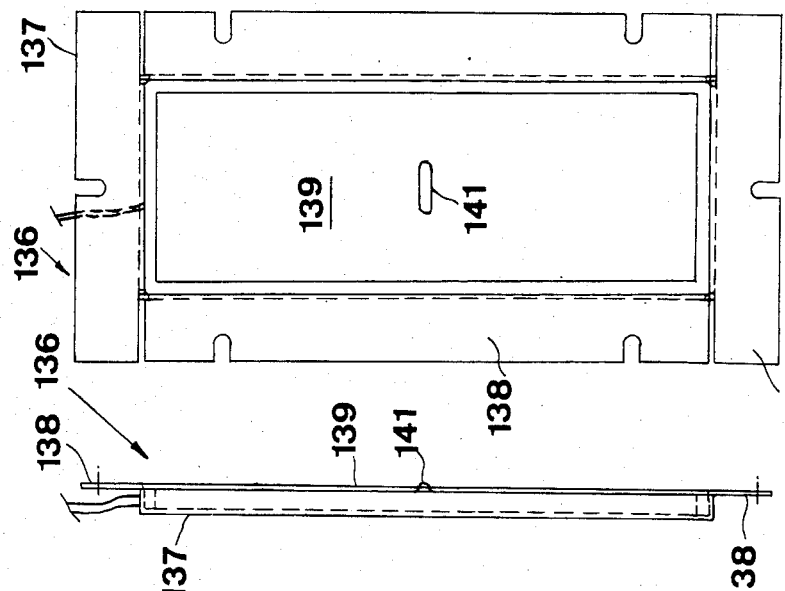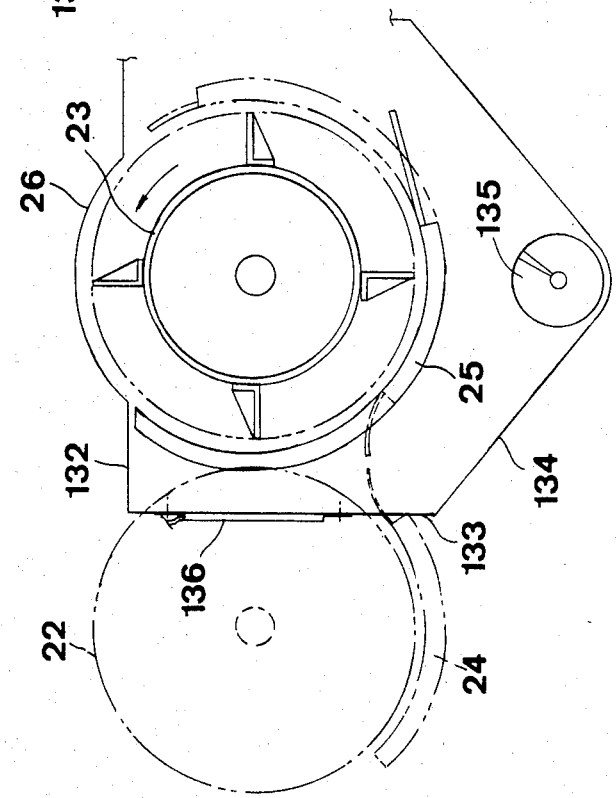

STRAW CHOPPER DRIVE

BACKGROUND OF THE INVENTION

This invention relates to drive means and has particular, but not exclusive, reference to agricultural machines such as drives to straw choppers on combine harvesters, for example.

In agricultural machines, much use is made of flexible drive transmissions, which normally employ either chains or belts, and there always arises the problem of maintaining tension in the flexible member in order to preserve the integrity of the drive. Tensioning means are necessary automatically to compensate for any wear and natural stretching of belts which would otherwise give rise to possible belt slip and hence loss of drive, or for any wear in the links of chains which results in effect in "stretching" of the chain with the runs thereof becoming slack to the extent that the chain can jump off the drive sprocket and/or driven sprocket.

Typically, spring loaded tension pulleys (in the case of belts) or tension sprockets (in the case of chains) are employed as the tensioning means but these are not always convenient in that they take up room within the actual transmission and in certain circumstances, such as the use of a crossed belt to effect drive reversal, a tension pulley is difficult, if not impossible to employ. Problems also arise in providing satisfactory tension in relative long flexible drive transmissions from the standpoint of cost and maintenance.

The invention will be described primarily in the context of combine harvesters and it should be noted that the terms "grain", "straw", and "tailings" are used principally throughout this specification for convenience. It should be understood, however, that these terms are not intended to be limiting. Thus "grain" refers to that part of the crop which is threshed and separated from the discardable part of the crop material which is referred to as "straw". Incompletely threshed ears are referred to as "tailings".

SUMMARY OF THE INVENTION

According to the present invention drive means are provided comprising driving means, driven means, and intermediate means located between the driving means and the driven means such that there is an angled line of drive between the driving means and the driven means, first flexible drive transmission means extending between the driving means and the intermediate means, and second flexible drive transmission means extending between the intermediate means and the driven means, first tensioning means operable to move the intermediate means in a direction to tension the first flexible drive transmission means, and second tensioning means operable to move the intermediate means in a direction to tension the second flexible drive transmission means.

In a preferred embodiment, the intermediate means comprises a shaft one end of which is acted upon by the first and second tensioning means, and the other end of which is acted upon by third tensioning means operable to tension third flexible drive transmission means extending between the intermediate means and further driven means. Also, the first and second tensioning means effectively act on a parallelogram linkage arrangement on which said one end of the shaft is supported, the limbs of the parallelogram being pivotally attached one to the other, whereby the first and second tensioning means are operable independently. One limb of the parallelogram linkage is attached to the article on which the drive means is fitted and the shaft is supported on the opposed limb.

It will be seen that the present invention provides drie means in which tension is maintained in the flexible drive transmission means without having to resort to the use of tension pulleys or the like.

BRIEF DESCRIPTION OF THE DRAWINGS

A combine harvester in accordance with the present invention will now be described in greater detail, by way of example, with reference to the accompanying drawings wherein:

FIG. 10 is an enlarged view of a portion of FIG. 1;

FIG. 11 is an enlarged partial view of FIG. 10; and

FIG. 12 is a view from the right-hand side of FIG. 11.

DETAILED DESCRIPTION OF THE PREFERRED EMBODIMENT

Figure 1:
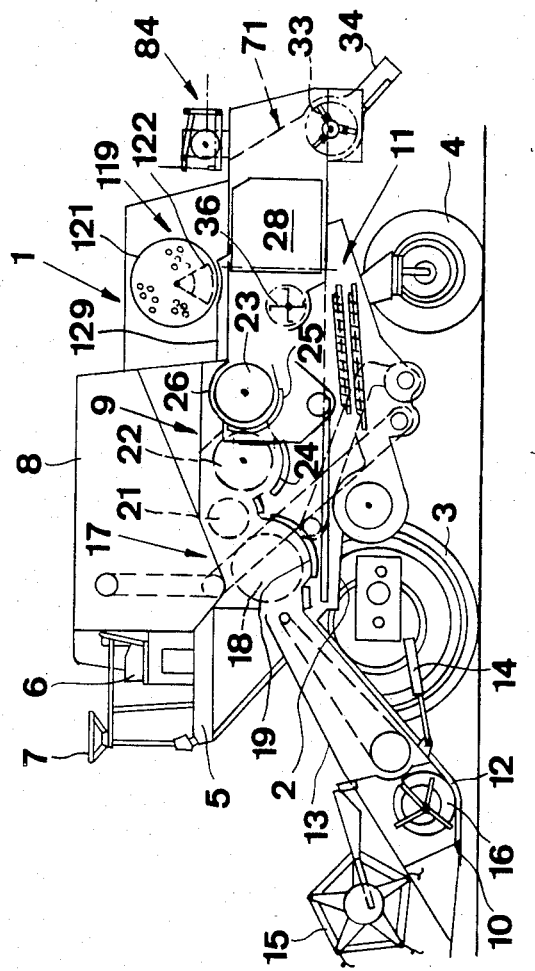
FIG. 1 is a diagrammatic side elevation of the combine harvester.

Referring now to the drawings and, particularly, to FIG. 1, a side elevational view of a combine harvester can be seen. Any left and right references are used as a matter of convenience and are determined by standing at the rear of the machine, facing the forward end, the direction of travel. The combine harvester 1 comprises a main chassis or frame 2 supported on a front pair of drive wheels 3 and a rear pair of steerable wheels 4. Supported on the main chassis 2 are an operator's platform 5 with a driver's seat 6 and a steering wheel 7, a grain tank 8, a threshing and separating mechanism indicated generally at 9, a grain cleaning mechanism 11 and an engine E. A conventional header 12 and straw elevator 13 extend forwardly of the main chassis 2, and the header is pivotally secured to the chassis for generally vertical movement which is controlled by extensible hydraulic cylinders 14.

As the combine harvester 1 is propelled forwardly over a field with standing crop, the latter is severed from the stubble by a sickle bar 10 on the header 12, whereafter a reel 15 and a header auger 16 convey the cut crop to the straw elevator 13 which supplies it to the threshing and separating mechanism 9. The crop received within the threshing and separating mechanism 9 is threshed and separated that is to say the crop (which may be wheat, corn, rice, soybeans, rye, grass seed, barley, oats or other similar crops) is rubbed and beaten, whereby the grain, seed or the like, is loosened and separated from the straw, stalks, coils or other discardable part of the crop.

Grain which has been separated from the straw falls onto the grain cleaning mechanism 11 which comprises means to separate chaff and other impurities from the grain, and means to separate unthreshed materials (tailings). Cleaned grain is then elevated into the grain tank 8 and the tailings are reprocessed in separate tailings rethreshers (not shown) and returned to the cleaning mechanism 11 for repeat cleaning action.

The header 12 is of the grain type, but clearly other forms of headers may be employed (for example a corn header), depending on the crop to be harvested.

A threshing portion 17 of the threshing and separating mechanism 9 comprises a rotatable threshing cylinder 18 cooperable with a stationary threshing concave 19. Rearwardly of the threshing mechanism 17, a deflector beater, or so called straw beater, 21 with an associated beater grate is provided. The straw beater 21 has a smaller diameter than the threshing cylinder 18 and is arranged above the level of the discharge end of the threshing concave 19. The straw beater 21 and beater grate have substantially the same width as the threshing mechanism 17.

A separator portion of the threshing and separating mechanism 9 comprises a first separator rotor or cylinder 22 and a second rotor or cylinder 23 cooperable with respective concaves 24 and 25. The second rotor 23 is mounted within a separator housing 26 and both of these components have a width substantially exceeding the width of the first rotor 22 which is the same width as the beater 21 and the threshing mechanism 17. Preferably, the rotor housing 26 has a width approximately twice that of the rotor 22.

Figure 4:
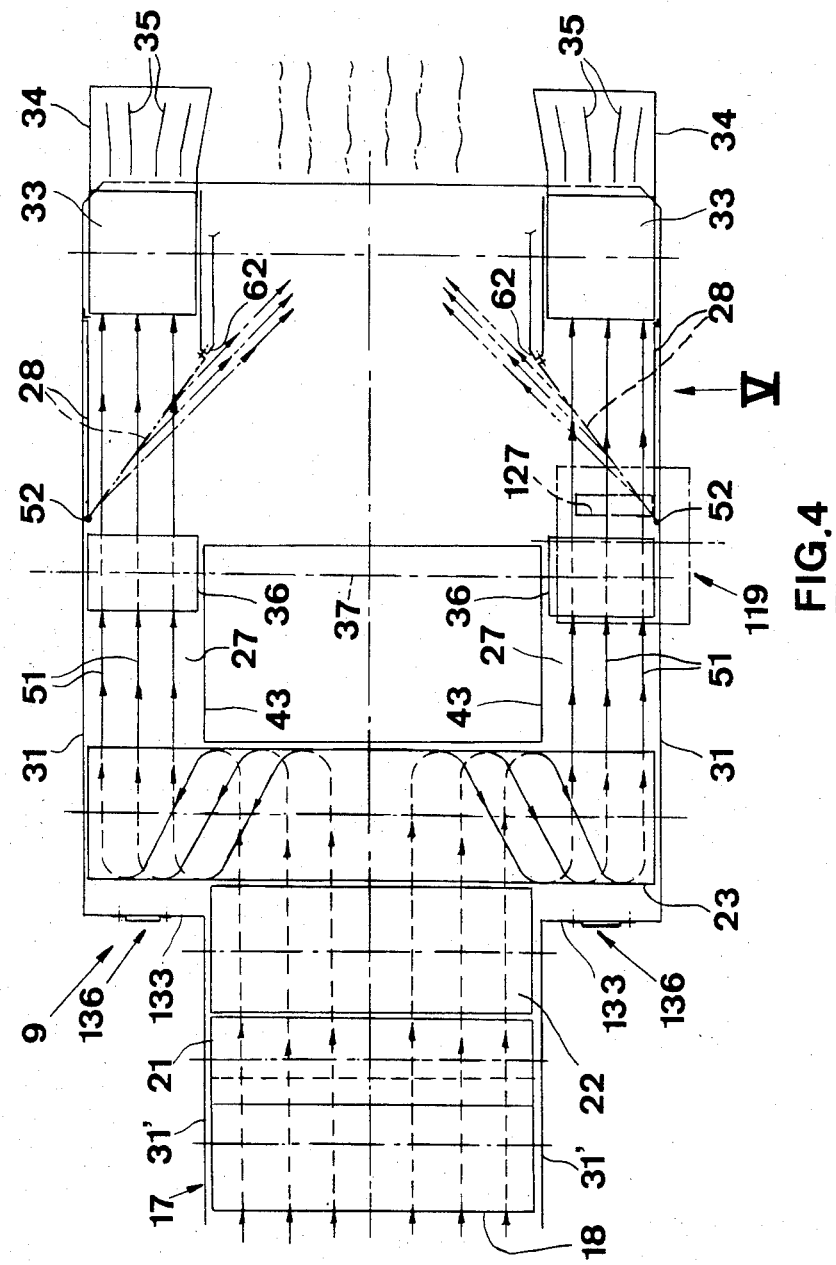
FIG. 4 is a schematic partial plan view of FIG. 1, showing the flow path of crop material through the combine harvester.

As seen in FIG. 4, the mat of crop material received by the separator rotor 23 from the separator rotor 22 is divided into two (by means not shown) and the resulting two portions moved spirally around the rotor 23 to respective ends thereof to complete the separating action. On reaching the ends of the rotor 23, the mats of crop material (straw) are propelled by the rotor through respective straw hoods 27 for discharge from the machine.

The components of the combine harvester so far described are disclosed in greater detail in British Specification No. 2,063,033 to which reference is made.

The crop material (straw) is discharged from the machine in one of two ways. In one mode of operation, the straw is discharged in a central windrow by virtue of the two independent streams of straw first being deflected by pivotable deflectors 28 (disposed in the broken line positions of FIG. 4), inwardly of the machine. In an alternative mode of operation, the deflectors 28 are pivoted to a position in which they lie against respective sidewalls 31 of the machine, thereby allowing the straw issuing from the ends of the rotor 23 to flow parallel to the sidewalls until it reaches further deflectors 32 which deflect the straw downwardly to respective straw choppers 33. The straw choppers 33 are rotary devices and they propel chopped straw through respective discharge outlets 34 which are inclined downwardly and flare outwardly, as seen in plan view (FIG. 4), and are effective to spread the straw across the full width of the machine and beyond, this spreading action being assisted by inclined vanes 35 provided within each outlet.

Figure 2:
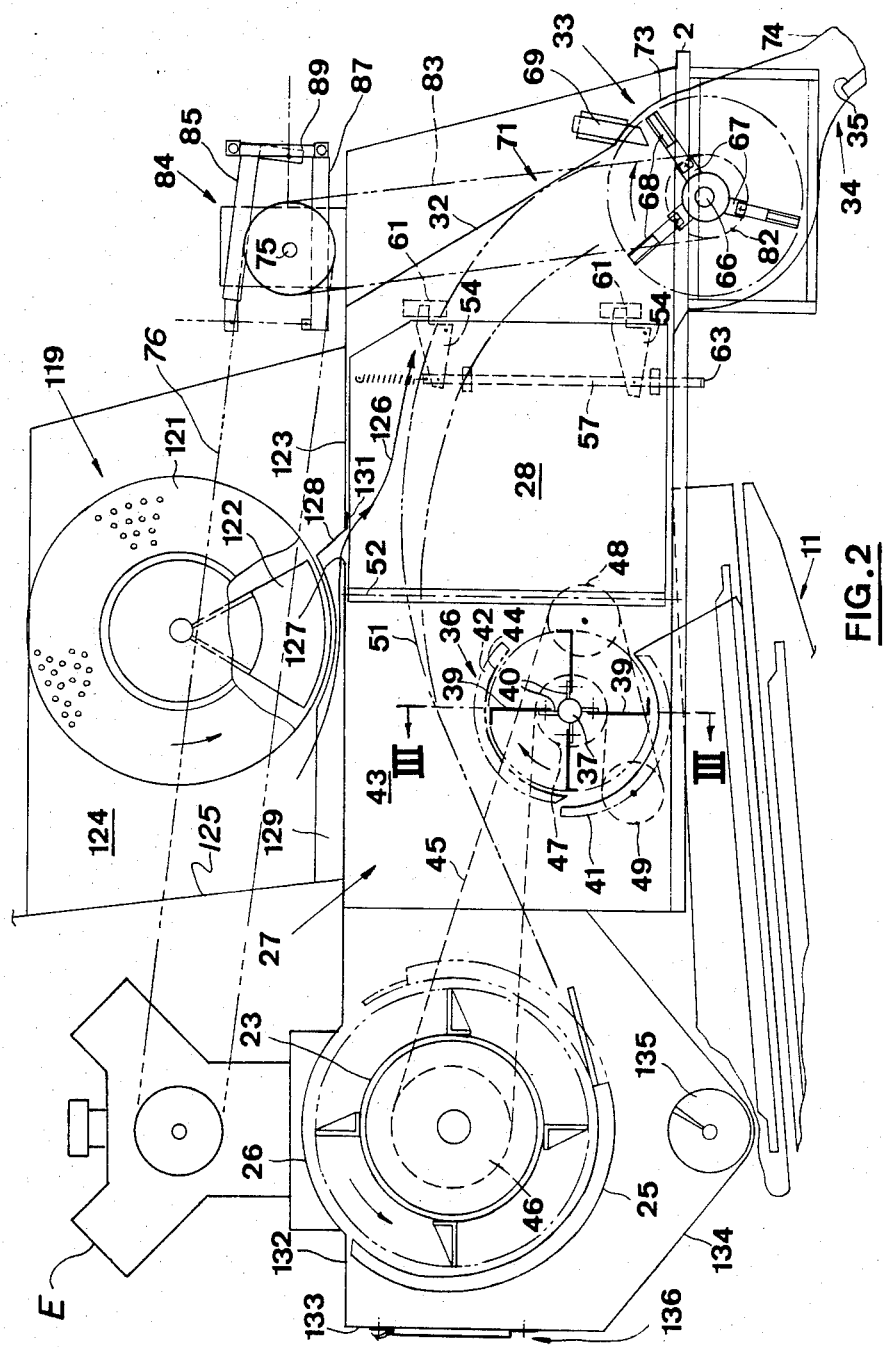
FIG. 2 is an enlarged partial side elevational view of the combine harvester seen in FIG. 1.

In order to assist the flow of straw from the rotor 23 through each straw hood 27, the latter is provided with discharge assist means 36 in the form of a rotor comprising a shaft 37 (common to both assist means—FIG. 3) on which are keyed two spaced collars 38 having four equispaced lugs 40 to which are attached respective rotor blades 39 extending radially of the shaft and along the full width of the discharge channel 27. The radially outer edge of each blade 39 is turned through 90° in a direction which trails with respect to the direction of rotation of the rotor, which is clockwise as seen in FIG. 2. Each discharge assist means 36 is provided with a protective shield 41 extending generally below the rotor. Arcuate shields 42 are attached to the opposed sidewalls 31,43 of each straw hood 27 to prevent straw from becoming wrapped around the shaft 37. Each shield 42 has a flange 44 extending a short distance axially of the shaft 37.

Figure 3:
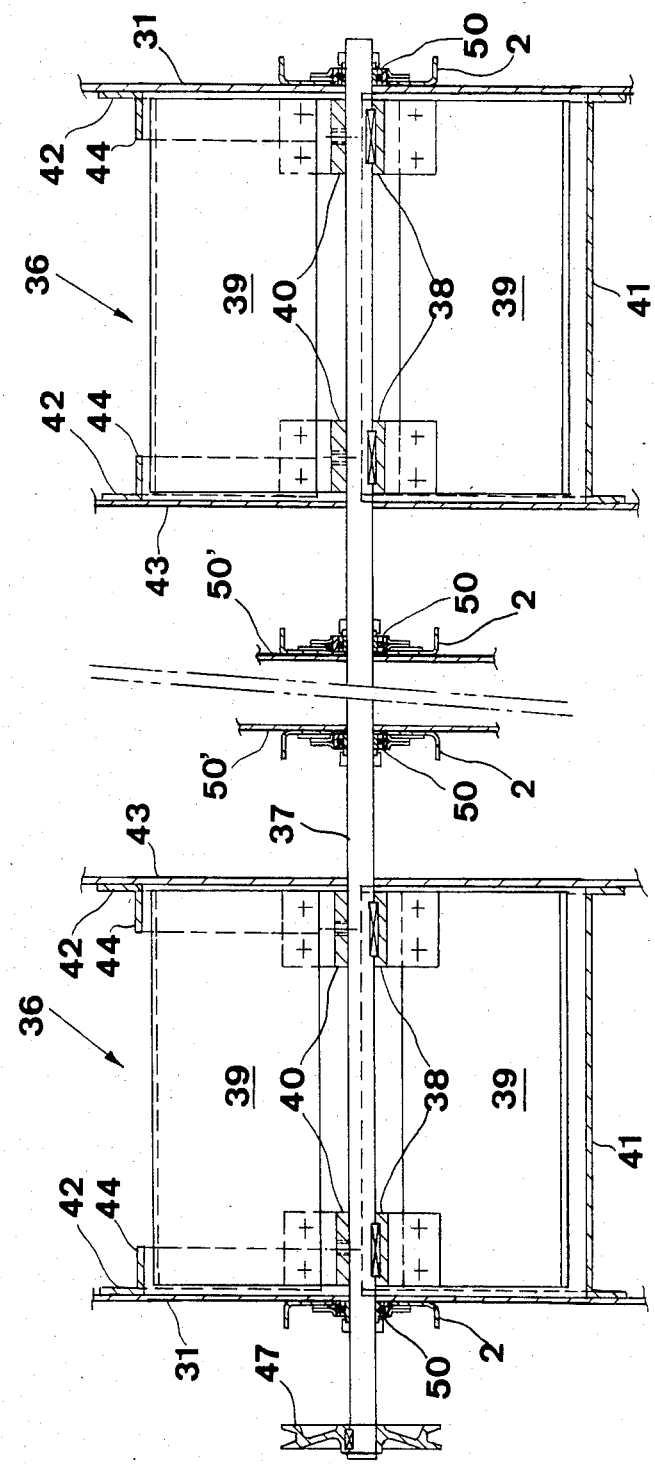
FIG. 3 is an enlarged section of III—III of FIG. 2.

The discharge assist means 36 are driven from the separator rotor 23 via a belt 45 extending between a pulley 46 on the rotor 23 and a pulley 47 on the shaft 37, via a reversing pulley 48, and a tension pulley 49. Thus the discharge assist means 36 are rotated clockwise, as already mentioned, which is contrary to the direction of rotation of the rotor 23. The shaft 37 is journalled in four bearings 50 mounted in respective sidewalls 31 and in intermediate walls 50', as seen in FIG. 3. The desired path of the straw in being transported from the rotor 23 to the rear, discharge end of the machine is indicated at 51 and it will be seen that each discharge assist means 36 is located below this path between the rotor 23 and the discharge end of the machine. Thus in normal circumstances, the discharge assist means 36 do not engage the straw which is important as regards the mode of operation in which the straw is formed into a central windrow. This is because the threshing rotor 18 and the separator rotors 22,23 have relatively aggressive actions on the crop material with a tendency to produce shorter and more broken pieces of straw than a machine not employing rotary separating means. Therefore, any engagement of the straw with the discharge assist means would increase the likelihood of straw chopping and breakage which is undesirable when the straw is to be conserved for baling, for example.

The action of each discharge assist means 36 is primarily that of a fan, whereby a stream of air is produced generally in the direction of the desired path 51 of straw discharge to assist in keeping the straw confined to that path. However, in the event that crop and/or operating conditions are such that the straw has a tendency to fall onto the discharge assist means 36 in passing through the straw hoods 27, then the blades 39 serve positively to deflect the straw in the intended paths 51 and thus prevent it from being discharged from the machine prematurely and in all likelihood on to the steerable wheels 4 and associated wheel axle with the possible consequence of the straw building up on these components and eventually blocking the entire straw discharge facilities of the machine. This arrangement of the discharge assist means 36 not only minimizes straw breakage, unlike the discharge beaters of known machines, but also minimizes power consumption (due to minimal contact with the straw) which is another very important consideration.

Figure 5:
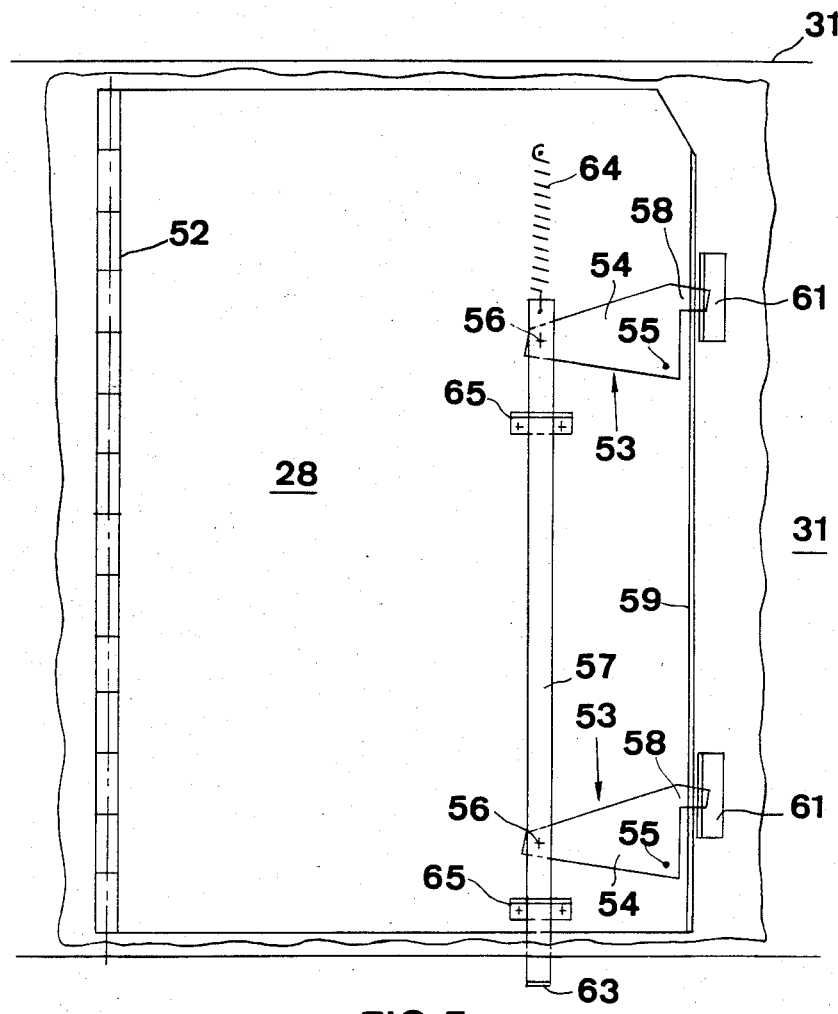
FIG. 5 is an enlarged partial side elevational view of the combine corresponding to the arrow V of FIG. 4.

The deflectors 28 are shown in greater detail in FIG. 5 and are in the form of doors hinged at 52 about a generally vertical axis, the hinges being secured to the respective sidewalls 31. Latches 53 are provided for securing the deflectors in the selected position, the latches comprising, for each deflector, a pair of latch members 54 pivoted at 55 to the deflectors and also pivoted at 56 to an actuating bar 57. Each latch member 54 has an extension 58 which passes through an associated slot in an edge flange 59 of the deflector 28 for engagement with a slot in a bracket 61 attached to the adjacent sidewall 31 (FIG. 5) when the deflectors are positioned so as to allow straw to pass to the straw choppers 33. In the alternative position shown in broken lines in FIG. 4, the latch member extensions 58 engage respective slots in respective vertical beams 62 which are part of the chassis 2.

Each bar 57 is formed with a handle 63 at the lower end and the other end is attached to the associated deflector 28 by a spring 64, the bar being movable in a generally downward vertical direction against the spring to pivot the latch members 54 and so release the latch member extensions 58 from either the slots in the brackets 61 or the slots in the beams 62, as the case may be. The deflectors 28 can then be swung to the alternative position and the handles 63 released, whereby the springs 64 pull the handles upwardly, thus pivoting the latch members clockwise as seen in FIG. 5 to engage the extensions 58 with the newly selected slots. Movement of the bars 57 is guided by respective brackets 65 attached to the deflectors 28 and having slots through which the bars pass.

Returning now to the straw choppers 33, these are generally conventional devices although not so the drive thereto as will be explained. The two straw choppers 33 are mounted on respective shafts 66 (FIG. 2) which carry axially spaced lugs 67 to which are pivotally attached clusters of knives 68. The knives 68 cooperate with stationary blades 69 adjustably mounted in a panel 71 associated with each chopper 33. Each panel 71 has a straight portion which acts as the deflector 32, to deflect straw into the relative chopper 33, followed by an arcuate portion 73 complementary to the circle generated by the tips of the rotating knives 68, which portion acts to guide straw to the outlets 34, and terminating in another generally straight portion 74 forming the top of the related outlet 34.

The straw choppers 33 are driven from a shaft 75 which in turn is drive by the engine E via a belt 76 extending around an input pulley 77 mounted on one end of the shaft 75 by bearings 78, whereby it is rotatable relative to the shaft when a magnetic clutch 79 is inoperative. When the clutch 79 is rendered operative, the pulley 77 is clutched to the shaft 75, whereby the latter is driven, and hence the straw choppers 33 are driven in a clockwise direction (as shown in FIG. 2) via respective pulleys 81 on the shaft 75, pulleys 82 on the shafts 66, and belts 83. In operation, the pulley 77 is continuously rotated by the clutch 79 is actuated only when the straw choppers 33 are required for use.

Contrary to the arrangement of conventional straw choppers, the direction of rotation of each chopper unit 33 is such that the straw is moved overtop with respect to the chopper rotors as it moves from the chopper inlets to the stationary knives 69. With this arrangement, the transfer of straw through the chopper units 33 is generally aligned with the path 51 of the straw within the straw hoods 27 immediately prior to entering the chopper units, whereby the movement of the straw is smooth and without any abrupt change of direction which reduces greatly the risk of plugging.

The straw chopper drive shaft 75 is mounted in a special manner and is, in fact, floatingly mounted in order to maintain tension in the belt 76 and the two belts 83 without the need to employ the usual tension pulleys. In view of the fact that one end of the shaft has the belt 76 and one belt 83 associated therewith, and in view of the fact that these two belts extend generally orthogonally giving an angled line of drive between the engine and the straw choppers, then this end of the shaft needs to be capable of two degrees of movement to be able to tension both belts. The other end of the shaft 75 needs only to be capable of one degree of movement since only one of the belts 83 is associated therewith. FIGS. 6 to 9 show the details of the mounting of the shaft 75.

Figure 9:
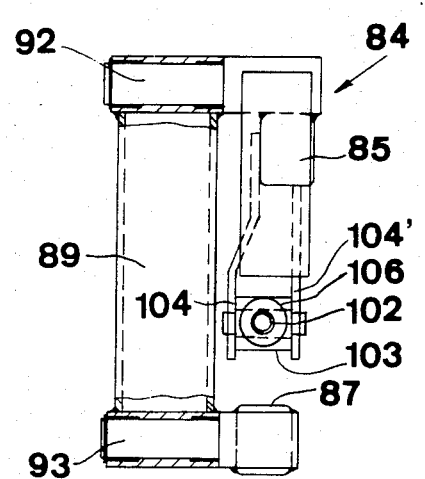
FIG. 9 is a view in the direction of arrow IX of FIG. 6.
Figure 8:
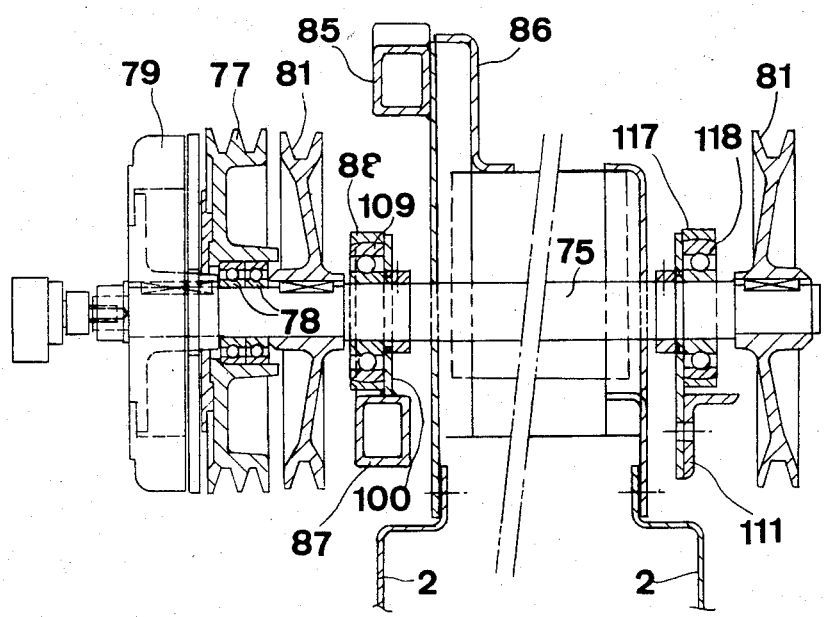
FIG. 8 is a section on the line VIII—VIII of FIG. 6.

Looking first at the two degree of floating movement afforded to the left-hand end of the shaft 75 (as seen in FIG. 8), this is accomplished by a parallelogram linkage arrangement generally indicated at 84 and comprising a generally horizontal beam 85 attached to a portion 86 of the main frame or chassis 2 of the machine, a beam 87 generally parallel to the beam 85 and carrying a bearing housing 88 for the associated end of the shaft 75, a generally upright beam 89 pivotally attached at respective ends to the beams 85 and 87, and a rod 91 generally parallel to the beam 89 and also pivotally attached at respective ends to the beams 85 and 87. As seen in FIG. 9, the beam 89 is offset from the beam 85 and is pivoted on upper and lower spigots 92,93 carried by the beam 85 and the beam 87, respectively, the beam 87 being generally coplanar with the beam 85. The rod 91 is pivotally attached at the lower end to a lug 90 carried by the beam 87 and is slidingly received towards its other end in a slot in a hexagonal abutment member 94 which is pivotally mounted between two arms 95 extending from the beam 85 by respective spigots 96. A compression spring 97 providing tensioning means for the belt 83 acts between a flat on the hexagonal member 94 and a further abutment in the form of a washer 98 provided on the rod 91 and held in a selected position by a nut 99 received on the upper and threaded end of the rod. A cylinder 101 is placed over the spring 97 and serves to limit the compression of the latter by acting between the washer 98 and member 94 when the compression limit is reached.

The bearing housing 88 for the end of the shaft 75 is pivotally connected via a plate 100 to one end of a further rod 102 which is also slidingly received in a slot in a further hexagonal abutment member 103 similar to the member 94, the member 103 being mounted between spaced arms 104 and 104' (FIG. 9) extending from the beam 85. A compression spring 105 providing tensioning means for the belt 76 acts between a flat on the hexagonal member 103 and a washer 106 held by a nut 107 on the outer and threaded end of the rod 102, again a cylinder 108 enveloping the spring in order to limit compression thereof. A self-aligning (spherical) bearing 109 is mounted in the bearing housing 88 and the shaft 75 is journalled therein.

Figure 6:
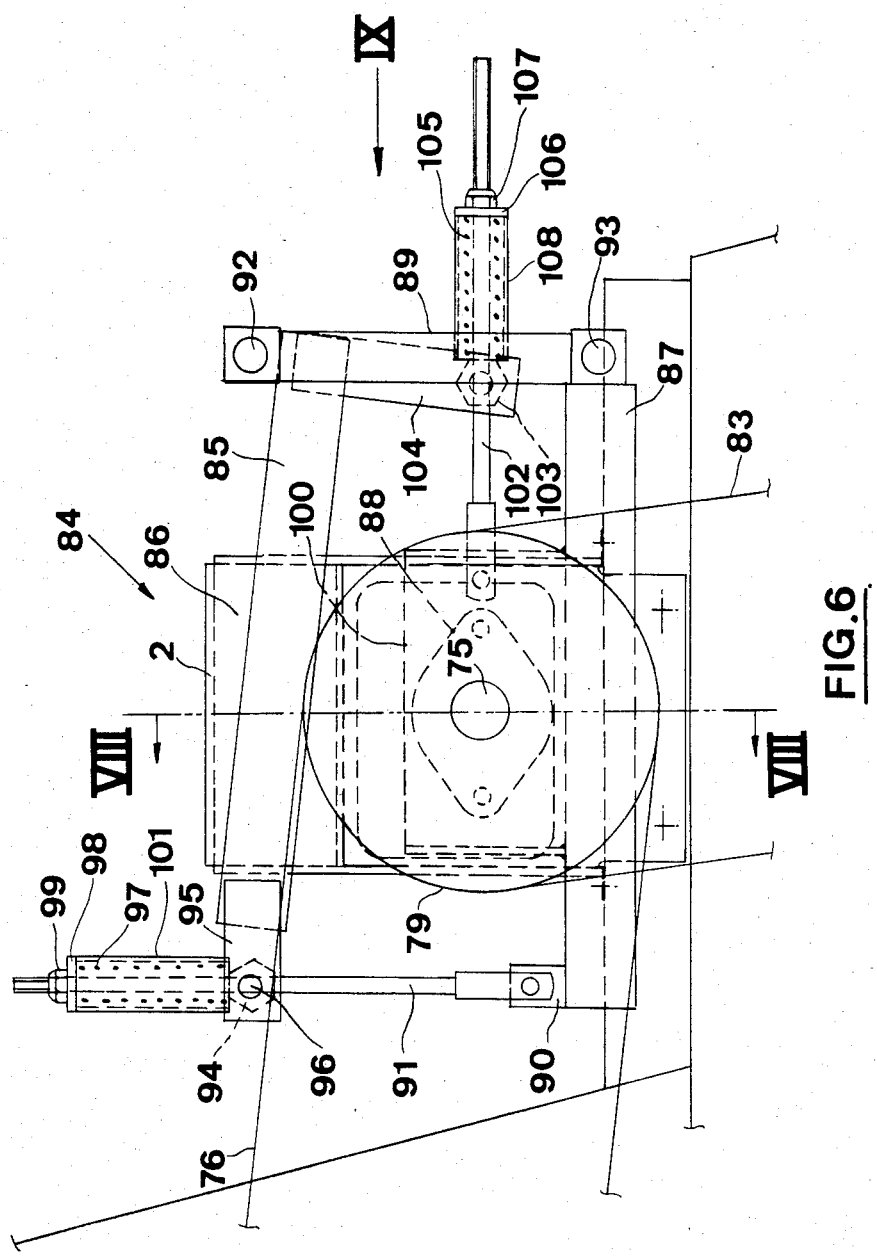
FIG. 6 is an enlarged side elevational view of a portion of the combine seen in FIG. 2.
Figure 7:
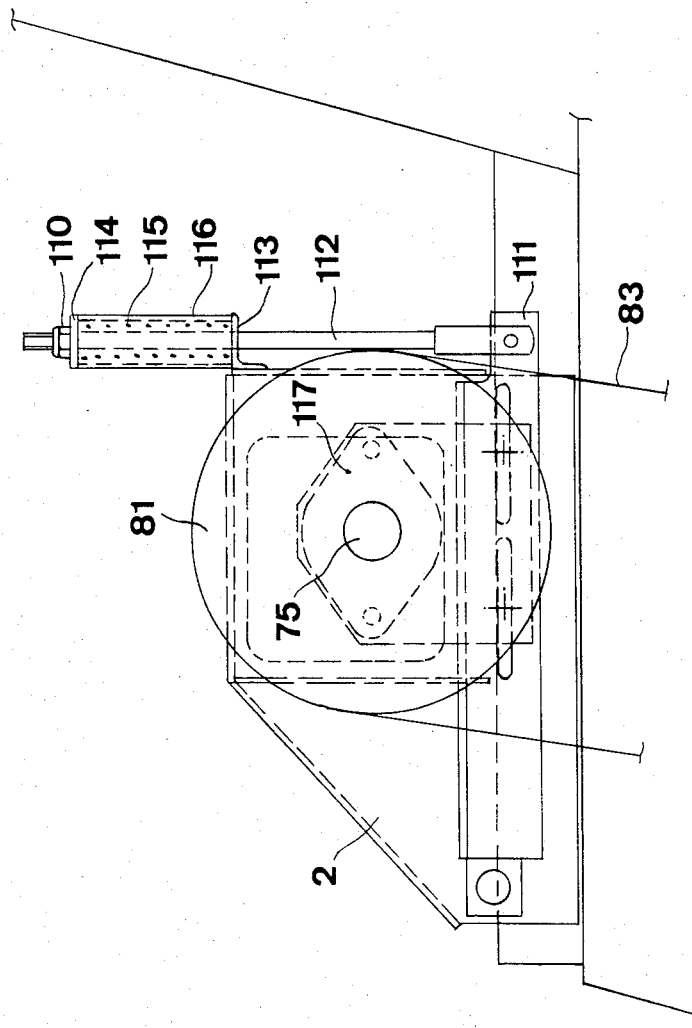
FIG. 7 is a view of the opposite end of the component to that shown in FIG. 6.

The springs 105 and 97 serve to urge the related end of the shaft 75 to the right and upwardly, respectively, (as seen in FIG. 6) in order to tension the belts 76 and 83, the one movement being independent of the other by virtue of the parallelogram mounting arrangement for this end of the shaft. As the spring 105 urges the rod 102 to the right as seen in FIG. 6, this moves the bearing housing 88, and hence shaft 75 and beam 87, in the same direction, the spring thus effectively acting on the parallelogram arrangement. Movement of the beam 87 results in the lower ends of the beam 89 and rod 91 also moving to the right while simultaneously pivoting and thus not imparting any substantial vertical movement to the shaft 75 which would affect the tension in one or both belts 83. Likewise, the spring 97 urges the rod 102 upwardly which pulls the beam 87, and hence bearing housing 88 and shaft 75, upwardly to tension the belt 83 without significantly affecting the tension in the belt 76.

Looking now to the other end of the shaft 75 (FIG. 7), this has only one degree of movement, as already explained, and this is accomplished by a generally horizontal beam 111 pivotally attached at one end to the main frame or chassis 2 of the machine and being pivotally attached at the other end to one end of a generally vertical rod 112 slidingly received towards its other end in a slot provided in a bracket 113 attached to the main frame 2. The upper end of the rod 112 is threaded and receives a nut 110 which retains a washer 114. A compression spring 115 acts between the washer 114 and bracket 113 and a cylinder 116 surrounds the spring to limit compression thereof, the spring providing tensioning means for the associated belt 83.

The spring 115 urges the rod 112 upwardly which pulls the beam 111 carrying a bearing housing 117 or the shaft 75 and movement of the beam thus moves the bearing housing and the shaft, whereby the related belt 83 is tensioned. Again, a self-aligning (spherical) bearing 118 is provided in the housing 117 for the shaft 75. It will be appreciated that the self-aligning bearings 109 and 118 at respective ends of the shaft 75 allow movement of one end for belt tensioning purposes independent of movement of the other end. Further, it will be appreciated that the tension in the belts 76 and 83 is automatically maintained (whereby belt stretch is constantly compensated), and that the initial tension can be set by adjusting the nuts 99, 107 and 110 and hence altering the compression of the related springs.

Returning now to FIGS. 2 and 4, it will be seen that the combine harvester is provided with the usual air screen 119 through which air is drawn for cooling the engine coolant and/or transmission fluid, the air screen comprising a perforated member 121 in the form of a cylinder closed at one end, save for the perforations in the end as well as in the body, and mounted for rotation. Within the member 121 there is provided a stationary sector 122 (FIG. 2) which is imperforate and serves to blank off the perforations in successive portions of the member (both at the end and in the body) as the latter rotates past the sector. In this way, any dust, chaff or other foreign matter sucked onto the outer surface of the member 121 by the air passing therethrough is released and needs to fall clear of the air screen to avoid being sucked back to portions of the air screen on either side of the sector 122. To this end, the sector 122 is arranged at the lowermost portion of the member 121 but in the illustrated embodiment, this means immediately adjacent the top 123 of one of the straw hoods 27 since the air screen 119 is mounted on a panel 124 of the main frame 2 over that straw hood. A transversely extending and generally upright panel 125 extends from the panel 124 whereby the air screen 119 is generally confined at one side and at its lower end which thereof increases the risk of foreign matter being re-circulated on the air screen rather than falling clear thereof.

In the illustrated arrangement, an attempt was made to conduct the released foreign matter away from the air screen 119 through a conduit leading from the latter. While the air flow created by rotation of the air screen 119 was found sufficient to blow the foreign matter part way down the conduit, it was insufficient to ensure reliable removable of such foreign matter under all conditions. Furthermore, it was noticed that short pieces of straw, which inevitably swirl around the combine harvester in operation, collected on the top 123 of the straw hood 27, especially in the corner at the transverse panel 125 and the top 123. This straw builds up very quickly to such an extent that the top layer is "held" in sliding contact with the air screen 119 thus greatly impairing the operation of the latter. Furthermore, such a build up of straw in the vicinity of the engine produces an unacceptable fire hazard.

It has been found that by providing an aperture 127 in the top 123 of the straw hood 27 not only is all of the foreign matter released from the air screen 119 by the sector 122 taken clear of the air screen, thereby preventing recirculation, but the straw collected on the top 123 around the air screen is to a large extent also cleared. The aperture 127 is rectangular (as shown in FIG. 4) and extends transversely of the machine, with an upwardly and forwardly inclined deflector 128 being provided along the downstream edge with respect to the direction of rotation of the air screen. In addition, a shield 129 extends from the outer edge of the deflector 128, beneath the air screen member 121, to the transverse panel 125. The shield 129 is located at the outer edge of the top 123 of the straw hood 27. The deflector 128 is formed with a flange 131 by which it is attached to the underside of the top 123 of the straw hood 27, this arrangement providing a smooth surface over which the foreign matter and straw can flow which would not be the case if the flange 131 were attached to the upper side of the top 123. The latter arrangement could result in build-up of material leading to blockage of the aperture 127.

It is thought that the somewhat surprising clearance of both foreign matter and straw through the aperture 127 along the path 126 is a result of the combined action of the rotating air screen 119 producing a flow of air towards the aperture, and the flow of straw within the straw hood 27 from the separator rotor 23 producing a further and assisting stream of air which is augmented by the action of the related discharge assist means 36. However, satisfactory clearance has been achieved with the air screen rotating and the rotors 18, 21, 22 and 23 and the discharge assist means 36 held stationary.

Turning now to FIGS. 10 to 12, FIG. 10 repeats the extreme left-hand portion of FIG. 2 but shows in addition the location of the separator rotor 22 in relation to the rotor 23 and separator housing 26. It will be seen that the ends of the separator mechanism 23,25 are contained within further housings each formed by a top wall 132 integral with the top wall of the associated separator housing 26, a front transversely extending wall 133 which bridges the associated sidewall 31 with a further but inset sidewall 31' of the machine, and a bottom wall 134 which is V-shaped as seen in end view (FIG. 10) and which houses a grain auger 135. Within an aperture in each wall 133 there is mounted a grain loss sensor 136 which closes off the aperture and which as shown in FIGS. 11 and 12, comprises a rectangular, dished mounting plate 137 having a flange 138 around its periphery by which it is bolted to the wall 133. A polycarbonate sheet 139 is mounted within, but spaced from, the mouth of the dished plate 137, being spaced also from the main surface of the plate. The space between the sheet 139 and the adjacent surfaces of the plate 137 is filled with a shock resistant material, such as polyurethane foam, and the edges of the sheet are sealed to the plate by a flexible sealant. The sheet 139 carries a piezoelectric crystal 141 which is thus vibrationally isolated from the combine so that spurious signals there-from are substantially eliminated. The plate 139 and crystal 141 face into the associated further housing at the end of the separator mechanism 23,25. Any grain separated through the concave 25 at the location of the grain loss sensor 136 are moved generally radially outwardly through the concave and strike the plate 139 thus vibrating it and inducing a signal in the crystal 141 which is representative of the grain still present in the straw and thus of the grain which is going to be lost by virtue of it being discharged with the straw. Measurements have indicated that signals produced by grain separated just prior to the actual discharge ends of the separator mechanism 23,25 are indeed representative of the grain losses actually occurring at the discharge ends.

The location of the grain loss sensors 136 in the vertical walls 133 of the further housings is particularly advantageous in that the sensors are highly accessible, unlike the sensors of the prior art, and yet they function in no less satisfactory manner. Furthermore and even more importantly, there is no likelihood of straw becoming hooked around the sensor resulting in plugging of the machine as there is when the sensor is mounted in the path of crop material below the separating rotor or straw walkers in known machines. This is because, on the one hand, the grain loss sensors 136 are mounted in generally vertical positions in an offset relationship with respect to the separator mechanism 23,25 rather than below the latter and, on the other hand, because each sensor is made an integral path of the associated wall 133, which, furthermore, is oriented generally vertically.

In operation, the combine harvester is driven into standing crop which is cut by the sickle bar 10, consolidated centrally of the machine by the header auger 16 and transported to the threshing cylinder 18 by the crop elevator 13. The threshed crop material issuing from the threshing cylinder is fed to the first separator rotor 22 with the assistance of the beater 21 and then passed to the second separator rotor 23. All grain separated from the crop material falls to the cleaning mechanism 11 through the concaves or grates associated with the threshing, beating and separating components referred to, and once cleaned is transported to the grain tank 8.

Before commencing operation, the operator selects whether the straw is to be chopped or windrowed and sets the deflectors 28 in the full or broken line positions, respectively, as seen in FIG. 5 by operating the handles 63, as best seen in FIG. 5, to release the latch members 54, swinging the deflectors to the required position and releasing the handles to allow the latch members to engage either the brackets 61 or the beams 62, as the case may be. If straw chopping is required, then the operator also has to actuate the clutch 79 in order to drive the shaft 75 and hence the straw choppers 33 through the belts 83.

The discharge of straw from the separator rotor 23 is assisted by the discharge assist means 36, as described, and the stream of straw flowing past the aperture 127 in one of the straw hoods 27 helps to clear the dust, chaff, etc., released from the air screen 119, and also to clear pieces of straw, etc. which tend to collect on top of that straw hood around the air screen. Grain separated at the respective ends of the separator mechanism 23,25 impacts upon the associated grain loss sensor 136 which produce signals representative of the grain loss being experienced at that particular time at the discharge end of the separator mechanism.

As already described, the special flotation arrangement for the shaft 75 ensures that tension in the belts 76 and 83 is automatically held substantially constant so that drive to the straw choppers 33 is always maintained, when required.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. Drive means comprising driving means, driven means, and intermediate means located between the driving means and the driven means such that there is an angled line of drive between the driving means and the driven means, first flexible drive transmission means extending between the driving means and the intermediate means, and second flexible drive transmission means extending between the intermediate means and the driven means, first tensioning means operable to move the intermediate means in a first direction to tension the first flexible drive transmission means, and second tensioning means operable to move the intermediate means in a second direction to tension the second flexible drive transmission means.

2. Drive means according to claim 1, wherein the intermediate means comprises a shaft one end of which is acted upon by the first and second tensioning means, and the other end of which is acted upon by third tensioning means operable to tension a third flexible drive transmission means extending between the intermediate means and a further driven means.

3. Drive means according to claim 2, wherein the first and second tensioning means effectively act on a parallelogram linkage arrangement on which said one end of the shaft is supported, the limbs of the parallelogram being pivotally attached one to the other, whereby the first and second tensioning means are operable independently.

4. Drive means according to claim 3, wherein one limb of the parallelogram linkage is attached to an article on which the drive means is fitted and the shaft is supported on the opposed limb.

5. Drive means according to claim 4, wherein the first tensioning means comprises a compression member acting between the parallelogram linkage and the article to urge the shaft in a direction appropriate to maintaining tension in the first flexible drive transmission means.

6. Drive means according to claim 5, wherein the compression member is mounted on a rod one end of which is pivotally attached to bearing means for the shaft and the other end of which is threaded to receive a nut for adjustment of the compression member, the compression member acting between a first abutment, held on the rod by the nut, and a second abutment effectively mounted on the article for pivotal movement and being apertured slidingly to receive the rod.

7. Drive means according to claim 6, wherein the bearing means for the shaft to which said one end of the rod is attached comprises a plate supporting a bearing housing for the shaft and fixed to said opposed limb.

8. Drive means according to claim 6 wherein the second abutment is carried by an extension of said one limb of the parallelogram linkage attached to the article.

9. Drive means according to claim 6 wherein the second tensioning means comprises a compression member acting between the parallelogram linkage and the article to urge the shaft in a direction appropriate to maintaining tension in the second flexible drive transmission means.

10. Drive means according to claim 9, wherein the compression member of the second tensioning means is mounted on a rod constituting a limb of the parallelogram linkage and having one end which is threaded to receive a nut for adjustment of the compression member, the compression member acting between a first abutment held on the rod by the nut, and a second abutment effectively mounted on the article for pivotal movement and being apertured slidingly to receive the rod.

11. Drive means according to claim 10, wherein the second abutment is carried by a further extension of said one limb of the parallelogram linkage attached to the article.

12. Drive means according to claim 10, wherein the third tensioning means comprises a compression member acting between the article on which the drive means is fitted and, in effect, said other end of the shaft to urge the shaft in a direction appropriate to maintaining tension in the third flexible drive transmission means.

13. Drive means according to claim 12, wherein the compression member of the third tensioning means is mounted on a rod one end of which is pivotally attached to one end of an arm supporting said other end of the shaft, and the other end of the rod being threaded to receive a nut for adjustment of the compression member, the compression member acting between a first abutment held on the rod by the nut, and a second abutment mounted on the article, and the other end of the arm being pivotally attached to the article.

14. Drive means according to claim 13, wherein the second abutment comprises a bracket mounted on the article.

15. Drive means according to claim 13, wherein the arm supports the shaft via a further bearing housing of the latter.

16. Drive means according to claim 13, wherein the compression members of the first, second and third tensioning means are each contained within a member such that the latter can act between the respective first and second abutments to limit the compression of the compression member.

17. Drive means according to claim 16, wherein the first, second and third flexible drive transmission means are each in the form of a belt.

18. Drive means according to claim 17, wherein the shaft is rotatably supported within the respective bearing housings via self-aligning bearings.

19. Drive means according to claim 18, wherein the drive means transfers rotational power to a straw chopper on a combine harvester.

* * * * *